(12) United States Patent
Jiang et al.

(10) Patent No.: US 10,943,266 B2
(45) Date of Patent: Mar. 9, 2021

(54) PERSONALIZED MOBILE APPLICATION RE-ENGAGEMENT

(71) Applicant: Google LLC, Mountain View, CA (US)

(72) Inventors: Xin Jiang, San Ramon, CA (US); Tuna Toksoz, Mountain View, CA (US)

(73) Assignee: Google LLC, Mountain View, CA (US)

( * ) Notice: Subject to any disclaimer, the term of this patent is extended or adjusted under 35 U.S.C. 154(b) by 468 days.

(21) Appl. No.: 14/737,300

(22) Filed: Jun. 11, 2015

(65) Prior Publication Data

US 2016/0364765 A1 Dec. 15, 2016

(51) Int. Cl.
*G06Q 30/02* (2012.01)

(52) U.S. Cl.
CPC ..... *G06Q 30/0271* (2013.01); *G06Q 30/0275* (2013.01)

(58) Field of Classification Search
CPC .................................................. G06Q 30/0267
See application file for complete search history.

(56) References Cited

U.S. PATENT DOCUMENTS

| | | | | |
|---|---|---|---|---|
| 2010/0228634 | A1* | 9/2010 | Ghosh | G06Q 30/02 705/14.71 |
| 2014/0164101 | A1* | 6/2014 | S | G06Q 30/0267 705/14.45 |
| 2015/0169529 | A1* | 6/2015 | Niessen | G06F 17/2247 715/212 |
| 2016/0104213 | A1* | 4/2016 | Graziano | G06Q 30/0273 705/14.69 |
| 2016/0267540 | A1* | 9/2016 | Garcia | G06Q 30/0267 |

OTHER PUBLICATIONS

Anonymous, "Using re-engagement to keep your users coming back for more . . . and more . . . and more," Mobile App Tracking [online], Jan. 2014 [retrieved on Jul. 28, 2015]. Retrieved from the Internet: URL<https://web.archive.org/web/20140124011709/http:/www.hasoffers.com/wp-content/uploads/WhitePapers_MobileReengagementv5-copy.pdf>, 7 pages.

(Continued)

*Primary Examiner* — Breffni Baggot
(74) *Attorney, Agent, or Firm* — Fish & Richardson P.C.

(57) ABSTRACT

Methods, systems, and apparatus include computer programs encoded on a computer-readable storage medium for delivering content. A method includes: identifying an application that is installed on a user device; accepting a bid from a sponsor associated with the application for presenting customized content on the user device after installation of the application on the user device; identifying an opportunity to present content on the user device including receiving a request for content that identifies the user device; conducting an auction including evaluating the accepted bid along with other bids; determining that the accepted bid is the winning bid in the auction and providing, in response to the determining, a shell for the customized content; enabling the shell to be populated with data stored on the user device to produce the customized content; and providing the customized content for presentation on the user device in response to the identified opportunity.

19 Claims, 6 Drawing Sheets

(56) References Cited

OTHER PUBLICATIONS

Aquino, "Why App Re-Engagement Ads are the Next Big Thing in Mobile Advertising," Ad Exchanger [online], Jan. 7, 2014 [retrieved on Jul. 28, 2015]. Retrieved from the Internet: URL<https://web.archive.org/web/20140926000015/http:/www.adexchanger.com/mobile/why-app-re-engagement-ads-are-the-next-big-thing-in-mobile-advertising/>, 5 pages.

Müller, "2014 is the Year of Re-Engagement," Wired, Innovation Insights [online], Mar. 26, 2014 [retrieved on Jul. 28, 2015]. Retrieved from the Internet: URL<https://web.archive.org/web/20140903040233/http:/insights.wired.com/profiles/blogs/2014-is-the-year-of-re-engagement>, 6 pages.

Nicole, "Nexage Brings Real-Time Bidding to Mobile Apps, Web," SiliconANGLE [online], Apr. 12, 2011 [retrieved on Jul. 28, 2015]. Retrieved from the Internet: URL<https://web.archive.org/web/20120822132711/http:/siliconangle.com/blog/2011/04/12/nexage-brings-real-time-bidding-to-mobile-apps-web>, 2 pages.

Schechter, "A New Way to Re-Engage Your Existing Mobile App Users," Facebook [online], Jan. 28, 2014 [retrieved on Jul. 28, 2015]. Retrieved from the Internet: URL<http://web.archive.org/web/20140907043957/https://developers.facebook.com/blog/post/2014/01/28/a-new-way-to-re-engage-your-existing-mobile-app-users/>, 5 pages.

\* cited by examiner

300

PERSONALIZED MOBILE APPLICATION RE-ENGAGEMENT

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for providing content to a user device. The method includes: identifying an application that is installed on a user device; accepting a bid from a sponsor associated with the application for presenting customized content on the user device after installation of the application on the user device; identifying an opportunity to present content on the user device including receiving a request for content that identifies the user device; conducting an auction including evaluating the accepted bid along with other bids; determining that the accepted bid is the winning bid in the auction and providing, in response to the determining, a shell for the customized content; enabling the shell to be populated with data stored on the user device to produce the customized content; and providing the customized content for presentation on the user device in response to the identified opportunity In general, another aspect of the subject matter described in this specification can be implemented in computer program products. A computer program product is tangibly embodied in a computer-readable storage device and comprises instructions. The instructions, when executed by a processor, cause the processor to: identify an application that is installed on a user device; accept a bid from a sponsor associated with the application for presenting customized content on the user device after installation of the application on the user device; identify, after the accepting, an opportunity to present content on the user device including receiving a request for content that identifies the user device; conduct an auction including evaluating the accepted bid along with other bids; determine that the accepted bid is the winning bid in the auction and providing, in response to the determining, a shell for the customized content; enable the shell to be populated with data stored on the user device to produce the customized content; and provide the customized content for presentation on the user device in response to the identified opportunity.

In general, another aspect of the subject matter described in this specification can be implemented in systems. A system includes one or more processors and one or more memory elements including instructions. The instructions, when executed, cause the one or more processors to: identify an application that is installed on a user device; accept a bid from a sponsor associated with the application for presenting customized content on the user device after installation of the application on the user device; identify, after the accepting, an opportunity to present content on the user device including receiving a request for content that identifies the user device; conduct an auction including evaluating the accepted bid along with other bids; determine that the accepted bid is the winning bid in the auction and providing, in response to the determining, a shell for the customized content; enable the shell to be populated with data stored on the user device to produce the customized content; and provide the customized content for presentation on the user device in response to the identified opportunity.

These and other implementations can each optionally include one or more of the following features. The bid can include one or more bid criteria selected from the group including an identifier for the user device, a time since the application was last initiated on the user device, or status of a user in the application. The auction can be conducted on the user device. The opportunity can be an offline opportunity, the auction can be conducted on the user device, and enabling the shell can include identifying customization data associated with the application that is stored on the device to be included in the shell to form the customized content. The customized data can include a name of the user, an identifier associated with the user, or a status of the user in the application. The opportunity can be an opportunity to present content in another application that is installed on the user device. The bid can be customized based on an identity of the user device. Customizing can include determining an amount of the bid by the application. Customizing can include determining, by a server, an amount to bid in the auction based on the identity of the user device. The shell can be a template, and enabling the shell to be populated further can include using an API to locate customized data associated with the user device and populate the shell with the customized data.

Particular implementations may realize none, one or more of the following advantages. An application publisher can bid for a re-engagement opportunity for a user on a user device after the user has installed the application on the user device. A re-engagement content item presented on a user device can be customized for a user based on information associated with the user and an application installed on the user device.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A sponsor associated with an application can provide a bid for presenting customized content on a user device after installation of the application on the user device. An opportunity to present content on the user device can be identified, including the receiving of a request for content that identifies the user device. For example, the opportunity can be an opportunity to present content in another application that is installed on the user device. An auction can be conducted for the opportunity, including the evaluation of the provided bid along with other bids. When the provided bid is the winning bid, a shell for customized content can be provided to the user device. The shell can be enabled to be populated with data stored on the user device to produce the customized content. For example, the data stored on the user device can include information about the user or information about a status of the user with regard to the application. The customized content can be presented on the user device in response to the identified opportunity.

For situations in which the systems discussed here collect information about users, or may make use of information about users, the users may be provided with an opportunity to control whether programs or features collect user information (e.g., information about a user's social network, social actions or activities, profession, demographics, a user's preferences, or a user's current location), or to control whether and/or how to receive content from a content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
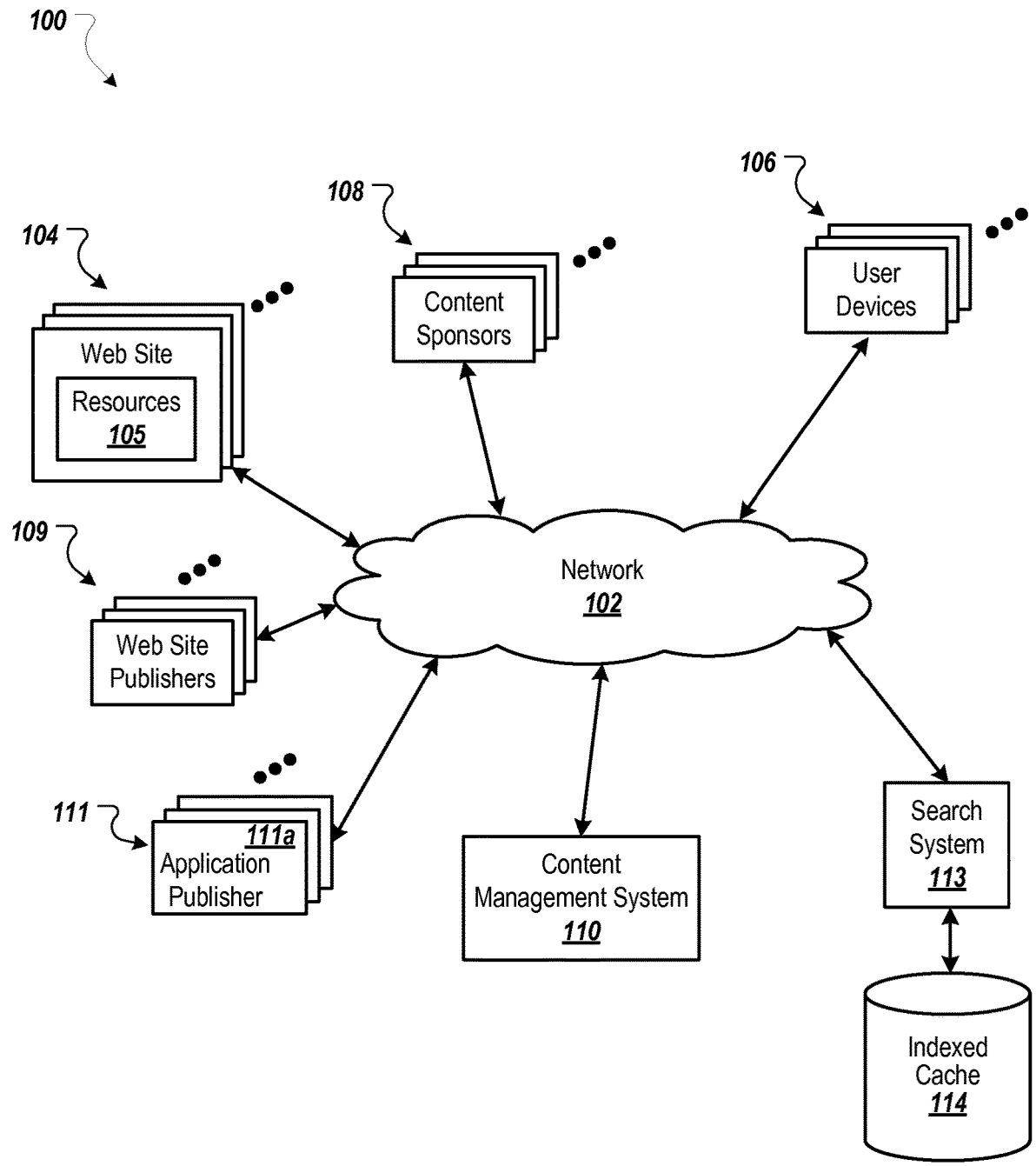
FIG. 1 is a block diagram of an example environment for providing content to a user device.

FIG. 1 is a block diagram of an example environment 100 for providing content to a user device. The example environment 100 includes a network 102, such as a local area network (LAN), a wide area network (WAN), the Internet, or a combination thereof. The network 102 connects websites 104, user devices 106, content sponsors 108, web site publishers 109, a content management system 110, application publishers 111, and a search system 113. The example environment 100 may include many thousands of websites 104, user devices 106, and content sponsors 108. The content management system 110 may be used for selecting and providing content in response to requests for content. The content sponsors 108 can be, for example, advertisers. Other types of content sponsors are possible.

A content sponsor 108 can create a content campaign associated with one or more content items using tools provided by the content management system 110. For example, the content management system 110 can provide one or more account management user interfaces for creating and managing content campaigns. The account management user interfaces can be made available to the content sponsor 108, for example, either through an online interface provided by the content management system 110 or as an account management software application installed and executed locally at a content sponsor's client device.

A content sponsor 108 can, using the account management user interfaces, provide campaign parameters which define a content campaign. The content campaign can be created and activated for the content sponsor 108 according to the parameters specified by the content sponsor 108. Campaign parameters can include, for example, a campaign name, a preferred content network for placing content, a budget for the campaign, start and end dates for the campaign, a schedule for content placements, content (e.g., creatives), bids, and selection criteria. Selection criteria can include, for example, a language, one or more geographical locations or websites, and one or more selection terms.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, applications, and news feed sources, to name only a few. The resources 105 can include content, such as words, phrases, videos, images and sounds, that may include embedded information (such as meta-information hyperlinks) and/or embedded instructions (such as scripts). A content sponsor 108 can act as a content publisher and can be associated with a website 104, and with one or more resources 105 (e.g., web pages, applications, other resources). Resources can be provided by the web site publishers 109 or by the application publishers 111, for example.

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. User devices 106 can also submit search queries to the search system 113 over the network 102. In response to a search query, the search system 113 can, for example, access an indexed cache 114 to identify resources 105 that are relevant to the search query. The search system 113 identifies the resources 105 in the form of search results and returns the search results to the user devices 106 in search results pages. A search result is data generated by the search system 113 that identifies a resource 105 that is responsive to a particular search query, and can include a link to the resource 105. An example search result can include a web page title, a snippet of text or a portion of an image extracted from the web page, and the URL (Unified Resource Location) of the web page.

A search result or a resource 105 can be sent responsive to a request received from a user device 106. The data representing the resource 105 or the search results can also include data specifying a portion of the resource 105 or search results or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

When a resource 105 or search results are requested by a user device 106, the content management system 110 may receive a request for content to be provided with the resource 105 or search results. The request for content can include characteristics of one or more slots or impressions that are defined for the requested resource 105 or search results. For example, a reference (e.g., URL) to the resource 105 or search results for which the slot is defined, a size of the slot, and/or media types that are available for presentation in the slot can be provided to the content management system 110. Similarly, keywords associated with a requested resource 105 or a search query for which search results are requested can also be provided to the content management system 110 to facilitate identification of content that is relevant to the resource 105 or search query. An identifier (e.g., cookie) associated with the user device 106 can be received with the request for content.

Based, for example, on data included in the request for content, the content management system 110 can select content items that are eligible to be provided in response to the request. One or more selected content items 114 can be provided to the user device 106 in association with providing an associated resource 105 or search results. The provided content item(s) can be presented on the user device 106, in one or more respective slots.

In some implementations, the content management system 110 can select content items based at least in part on results of an auction. For example, content sponsors 108 can provide bids specifying amounts that the content sponsors 108 are respectively willing to pay for presentation of their content items. In turn, an auction can be performed and the slots can be allocated to content sponsors 108 according, among other things, to their bids and/or the relevance of a content item to content presented on a page hosting the slot or a request that is received for the content item. For example, when a slot is being allocated in an auction, the slot can be allocated to the content sponsor 108 that provided the highest bid or a highest auction score (e.g., a score that is computed as a function of a bid and/or a quality measure). When multiple slots are allocated in a single auction, the slots can be allocated to a set of bidders that provided the highest bids or have the highest auction scores.

A particular application publisher 111a can create a re-engagement (e.g., remarketing) campaign to present content on user devices 106 on which an application of the application publisher 111a is installed. For example, the re-engagement campaign can be for presenting content on a user device 106 when the application has not been used for at least a threshold amount of time (e.g., the campaign content can encourage the user to use the application again), after a proscribed event (e.g., an event associated with installation of the application, execution of the application, use of the application, or other interaction with the application on the client device). As another example, the re-engagement campaign can be for presenting content on the user device 106 when the application has been installed but otherwise not used on the user device 106 (e.g., the campaign content can encourage the user to use the installed application).

The application publisher 111a can, for example, provide a bid for the re-engagement campaign to the content management system 110. As described in more detail below, the campaign can be enabled for a particular user device 106 when pre-defined criteria is met. For example, the application of the application publisher 111a can be installed on the user device 106 but not used for at least a threshold amount of time (e.g., thirty days). As described in more detail below, the content management system 110 and/or a service running on the user device 106 can determine that campaign criteria has been met, for example.

After a re-engagement campaign of the application publisher 111a has been enabled, an opportunity to present content on the user device 106 can be identified. For example, the content management system 110 can receive a request for content that identifies the user device 106. The opportunity can be an opportunity to present content a web browser or in another application (e.g., associated with the same or a different application publisher 111) that is installed on the user device 106, for example.

The content management system 110 can conduct an auction for the opportunity. For example, the content management system 110 can evaluate the bid provided by the application publisher 111a for the re-engagement campaign along with other bids (e.g., bids associated with content sponsors 108, other bids provided by the application publisher 111a, or other bids provided by other application providers 111). As described in more detail below, in some implementations, the auction can be conducted on the user device 106, such as when the user device 106 is in an offline mode.

When the bid provided by the application publisher 111a is the winning bid, a shell for a customized content item can be provided to the user device 106. The shell can be enabled to be populated with data stored on the user device 106 to produce the customized content item. For example, the data stored on the user device 106 can include information about the user or information about a status of the user with respect to the application. A device service running on the device can populate the shell with data previously stored for the user on the user device 106. Shell population is described in more detail below. The customized content item can be presented on the user device 106 in response to the identified opportunity.

Figure 2:
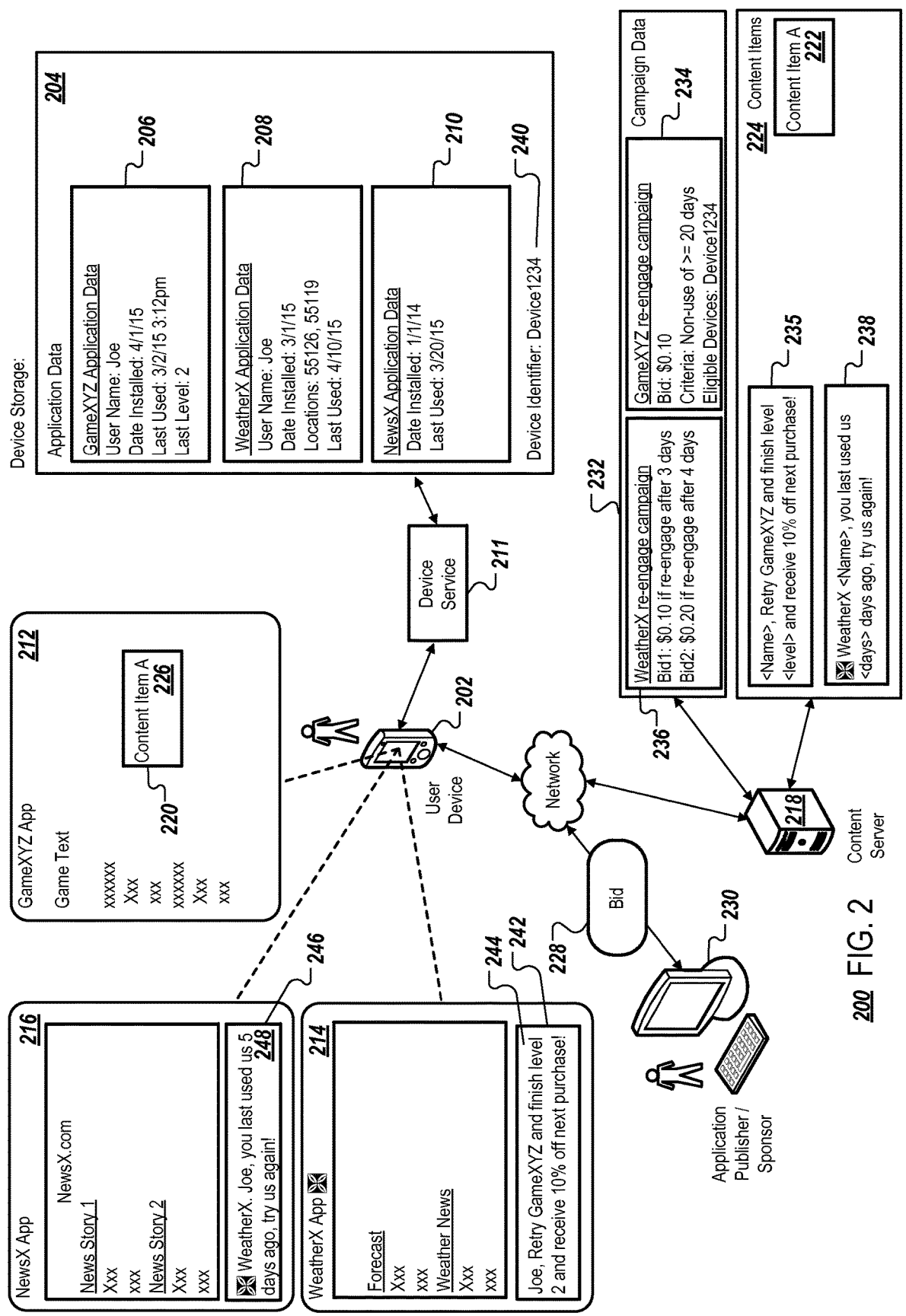
FIG. 2 is a block diagram of an example system for providing content to a user device.

FIG. 2 is a block diagram of an example system 200 for providing content to a user device 202. Several applications have been installed on the user device 202. Application data is stored for each installed application in device storage 204. For example, data 206, 208, and 210 are stored in the device storage 204 for "GameXYZ", "WeatherX", and "NewsX" applications, respectively. The applications can be respectively configured to store the data 206, 208, 210. The data 206, 208, and 210 can be stored, for example, each time a respective application is closed. User interfaces 212, 214, and 216 presented on the user device 202 correspond to the GameXYZ, WeatherX, and NewsX applications, respectively.

The data 206 can include a minimum set of information that is customized by the respective application. For example the data 206 stored by a respective application can be customized to enable a sponsor of the application to create as detailed or diminimus of a re-targeting campaign as desired. Types of data that can be stored include date of application installation, date of last use, status in the application, number of initiations of the application in a prior time period, user interactions with the application and the like. For example, the data 206 indicates when the GameXYZ application was installed and last used, to which game level the user last reached, and a user name for the user. Similarly, the data 208 indicates when the WeatherX application was installed and last used, a user name for the user, and weather forecast locations used in the WeatherX application. The data 210 indicates when the NewsX application was installed and last used.

The data 206, 208, and 210 can be stored in the device storage 204, for example, by the respective applications and/or by a device service 211 running on the user device 202. The device service 211 can be, for example, an application or background service that is part of or otherwise associated with the operating system of the user device 202. An application on the user device 202 can, for example, use an API (Application Programming Interface) provided by the device service 211 to store information in the device storage 204.

Some or all of the applications installed on the user device 202 can be configured to request content from a content server 218. For example, as illustrated in the user interface 212, the GameXYZ application can include a content slot 220. The user device 202 can send a request for content to the content server 218 for content to present in the content slot 220. The content server 218 can conduct an auction in response to the request and select a winning content item 222 from a content items repository 224. The winning content item 222 can be provided to the user device 202 for presentation in the content slot 220, as illustrated by a presented content item 226.

A sponsor of an application can provide a bid for a re-engagement campaign for presenting content on the user device 202 after the application associated with the sponsor has been installed on the user device 202 and after a campaign criteria has been met. Campaign criteria can be, for example, that the user has not used the application within the last predetermined number of days (e.g., 10 days).

For example, bid information 228 can be provided to the content server 218 by a sponsor device 230. The sponsor device 230 can be associated, for example, with the sponsor of the GameXYZ application. The bid information 228 can be stored in a campaign data repository 232 associated with the content server 218. The bid information 228 can include one or more bids and a criteria for each bid. For example, as illustrated by stored bid information 234 in the campaign data repository 232, bid information received from the sponsor of the GameXYZ application includes a bid of $0.10 and a criteria of "non-use of >=20 days". That is, the sponsor of the GameXYZ application is willing to pay $0.10 to present content associated with the GameXYZ application on the user device 202 when the user has not used the GameXYZ application for at least twenty days. As described in more detail below, the content associated with the GameXYZ application can be presented in another application installed on the user device 202. In general, a re-engagement bid can be expressed, for example, on a per-impression or per-interaction basis, or as a bid for a certain number (e.g., 100, 1000) impressions or interactions occurring on user devices on which the corresponding application is installed.

The bid information 228 can also include one or more shells for customized content. For example, the bid information 228 can include a shell 235 that has been received from the sponsor device 230 and stored in the content items repository 224. As described in more detail below, the shell 235 can be provided to the user device 202 and populated with data stored on the user device 202 to produce a customized content item for display on the user device 202 in response to a re-engagement opportunity.

The campaign data repository 232 also includes bid information 236 associated with the WeatherX application. The bid information 236 includes a first bid of $0.10 associated with the user re-engaging after 3 days (of non-use of the WeatherX application) and a second bid of $0.20 associated with the user re-engaging after 4 days (of non-use of the WeatherX application). The bid information 236 is associated with a shell for customized content 238. The shell 238, which includes a logo of the WeatherX application, is described in more detail below.

A determination can be made that the criteria associated with a re-engagement bid has been met. As described in more detail below, the content server 218 or the device service 211 can determine that the criteria has been met. For example, the device service 211 can determine that the criteria associated with the bid information 234 has been met, based on a last-used date for the GameXYZ application on the user device 202 of 3/2/15 and a current date, for example, of 4/15/15. The content server 218 can determine, for example, that the GameXYZ application has not been used for at least 20 days based on comparing the date of a last content request received from the user device 202 for the content slot 220 to the current date. In some implementations, the information as to past use can be provided as part of the original request for content that is provided to the content server 218. In some implementations, the bid information 234 includes or is associated with device identifiers (e.g., including a device identifier 240 of the user device) of user devices that are eligible to receive campaign content associated with the bid information 234. The device identifier 240 of the user device 202 can be included, for example, in each request for content received by the content server 218 from the user device 202, or be known, such as a result of a login operation by the user to a service.

After the criteria associated with the bid information 234 has been met, the content server 218 can receive a request for content from the user device 202 for a content slot 242 included in the user interface 214 of the WeatherX application. The request for content for the content slot 242 can include or be associated with the device identifier 240 of the user device 202. In some implementations, the content server 218 can determine that the received device identifier 240 is included in the bid information 234.

The content server 218 can conduct an auction for the request for content for the content slot 242 and evaluate the bid received from the content sponsor of the GameXYZ application along with other bids. The content server 218 can determine that the bid included in the bid information 234 is the winning bid, for example, based on an auction score associated with the bid included in the bid information 234 being higher than other auction scores in the auction.

The content server 218 can determine that the shell 235 corresponds to the winning bid, provide the shell 235 to the user device 202, and enable the shell 235 to be populated with data stored on the user device 202 to produce a customized content item 244 (e.g., by for example including a script in the shell that retrieves the data or otherwise interacts with a local service for populating the shell). The shell 235 can include information that indicates that a content presentation opportunity exists for the application and that the shell 235 is to be populated with data stored on the user device 202. For example, the device service 211 can receive the shell 235 and identify a <Name> tag and a <level> tag included in the shell 235. The device service 211 can identify a name of "Joe" and a last level of "2" from the data 206 associated with the GameXYZ application and substitute "Joe" for the <Name> tag and "2" for the <level> tag to produce re-engagement text of "Joe, Retry GameXYZ and finish level 2 and receive 10% off next purchase!" included in the customized content item 244. In some implementations, the shell 235 is stored on the user device 202, the device service 211 receives an instruction from the content server 218 to populate the shell 235, and the device service 211 populates the shell 235 using information from the data 206 in response to the instruction. The shell 235 can include, for example, one or more JSON (JavaScript™ Object Notation) requests and the device service 211 can populate the shell 235 by generating corresponding JSON responses.

In some implementations, a hosting application which presents a customized content item (e.g., the WeatherX application which presents the customized content item 244) opts in to presenting customized content items associated with other applications. For example, some application sponsors may choose to not opt in to presenting re-engagement content associated with other applications. A hosting application can be an application for which a re-engagement bid is provided, or can be an application for which no re-engagement bids have been provided. For example, the WeatherX application is both a hosting application (e.g., presenting the customized content item 244 associated with the GameXYZ application) and a re-engagement bid providing application (e.g., the WeatherX sponsor has provided the bid information 236).

As another example, the NewsX application has not provided a re-engagement bid but has opted in to present re-engagement bids associated with other applications. For example, the content server 218 can receive a request for content from the user device 202 for a content slot 246 included in the user interface 216 of the NewsX application. The content server 218 or the device service 211 can determine that the bid criteria associated with the bid information 234 (e.g., for the GameXYZ application) and the bid criteria for the second bid included in the bid information 236 (e.g., for the WeatherX application) have both been met.

The content server 218 can conduct an auction for the request for content for the content slot 246 and can evaluate the bids received from the content sponsors of the GameXYZ and WeatherX applications along with other bids. The content server 218 can determine that the second bid included in the bid information 236 is the winning bid, for example, based on an auction score associated with the second bid included in the bid information 236 being higher than other auction scores in the auction.

The content server 218 can determine that the shell 236 corresponds to the winning bid, provide the shell 236 to the user device 202, and enable the shell 236 to be populated with data stored on the user device 202 to produce a customized content item 248. For example, the device service 211 can receive the shell 236 and identify a <Name> tag and a <days> tag in the shell 236. The device service 211 can identify a name of "Joe" and determine a number of days since last use of 5 from the data 208 associated with the WeatherX application and can substitute "Joe" for the <Name> tag and "5" for the <days> tag to produce re-engagement text of "Joe, you last used us 5 days ago, try us again!" included in the customized content item 248.

In some implementations, an auction can be conducted on the user device 202 when the user device 202 is offline. For example, the GameXYZ application can be configured to send, using an API, a request for content for the content slot 220 to the device service 211. The device service 211 can determine whether the user device 202 is online. When the user device 202 is online, the device service 211 can forward the request for content for the content slot 220 to the content server 218, and the content server 218 can process the request, as described above. When the user device 202 is offline, the device service 211 can further process the request for content for the content slot 220, including conducting an offline auction. Offline auctions are described in more detail below with respect to FIG. 4.

Figure 3:
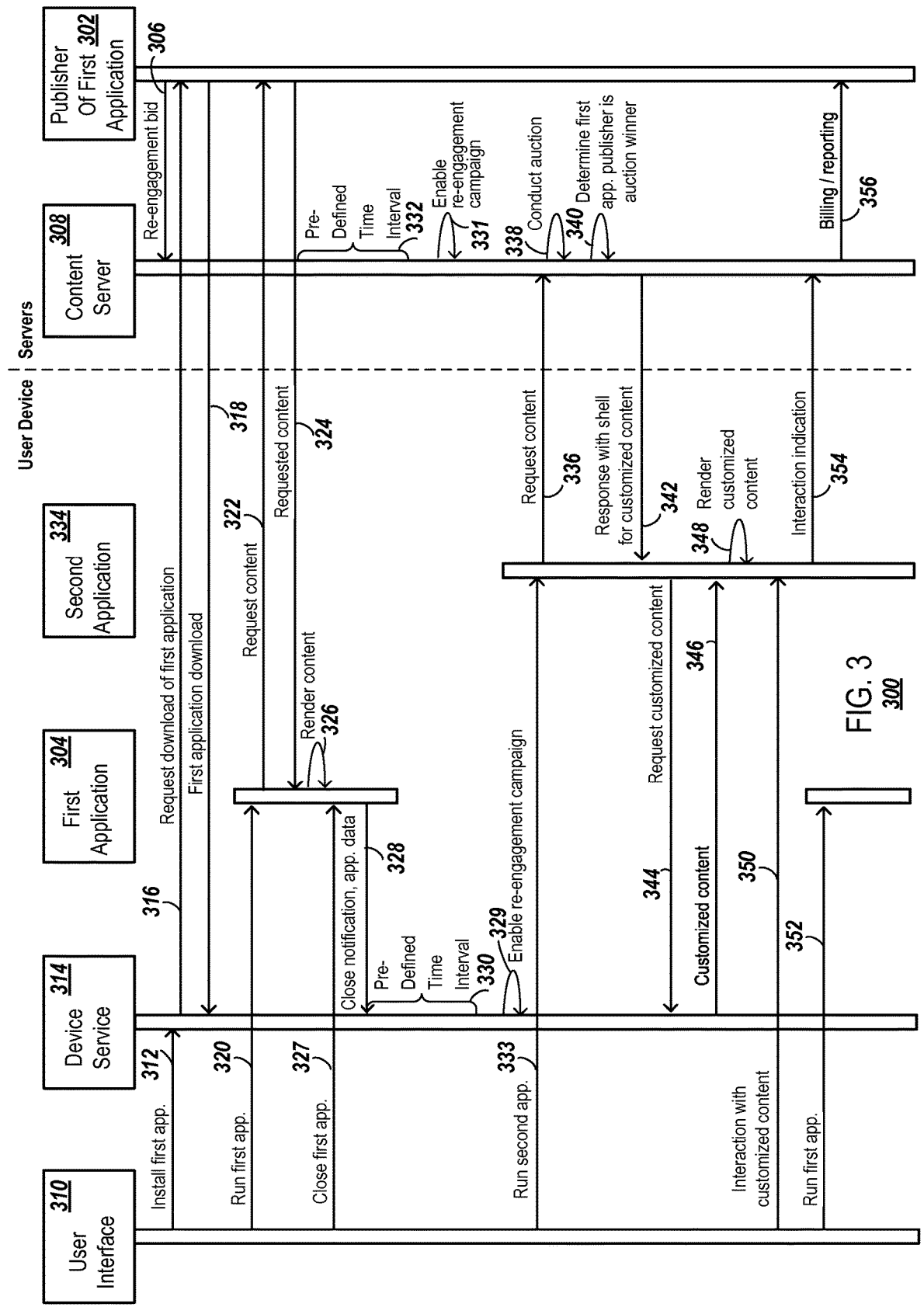
FIG. 3 is a sequence diagram of a process for presenting content in an online environment.

FIG. 3 is a sequence diagram of a process 300 for presenting content in an online environment. A publisher 302 of a first application 304 can submit a re-engagement bid 306 to a content server 308. The re-engagement bid 306 can be associated with a re-engagement campaign of the publisher 302 for presenting content on user devices on which the first application 304 has been installed. In some implementations, the publisher 302 also provides a shell for customized content to be customized to generate a re-engagement content item for the publisher 302 to be presented on a user device in response to a re-engagement opportunity. Campaign criteria which specify when the re-engagement campaign is to be enabled can also be provided by the publisher 302.

For example, a user can interact with a user interface 310 of a user device to request 312 installation of the first application 304. The request 312 can be received, for example, by a device service 314 running on the user device. The device service 314 can send a request 316 for download of the first application 304 to the publisher 302. The device service 314 can receive the first application download 318 and can install an instance of the first application 304 on the user device.

The user can interact with the user interface 310 to open (e.g., run) 320 the first application 304. The first application 304 can be configured to present sponsored content (e.g., in a content slot or a plurality of content slots in association with interfaces presented by the first application 304). Accordingly, the first application 304 can request 322 content for the content slot from the content server 308. The content server 308 can select content and provide the requested content 324 to the first application 304. The first application 304 can render 326 the requested content 324, e.g., in the content slot.

The user can close 327 the first application 304. The first application 304 can be configured to provide, upon closure, a closure notification and application data 328 associated with the first application 304 (e.g., application status) to the device service 314. Other information can be collected including interaction information for how a user interacts with the application when it is running.

A determination can be made to enable the re-engagement campaign for the publisher 302, the first application 304, and the user device, for example, based on a pre-determined amount of time elapsing since a last use of the first application 304 on the user device. For example, the device service 314 can enable 329 the re-engagement campaign based on determining that a pre-determined time interval 330 has elapsed since the last execution of the first application 304 on the user device. As another example, the content server 308 can enable 331 the re-engagement campaign based on determining that a pre-determined time interval 332 has elapsed since the last communication between the first application 304 and the content server 308. One or both of the pre-determined intervals 330 and 332 can be determined, for example, from campaign criteria received from the publisher 302.

After the re-engagement campaign has been enabled for the publisher 302 and the first application 304 on the user device, the user can interact with the user interface 310 to open (e.g., run) 333 a second application 334 that is installed on the user device. Similar to the first application 304, the second application 334 can be configured to present sponsored content (e.g., in a content slot). Accordingly, the second application 334 can request 336 content for the content slot from the content server 308. The content request 336 can include or be associated with a device identifier associated with the user device.

The content server 308 can conduct 338 an auction to determine content to provide responsive to the content request 336. The auction can include consideration of the re-engagement bid 306 associated with the publisher 302. The content server 308 can determine 340 that the publisher 302 is the auction winner.

The content server 308 can provide, to the second application 334, a response 342 that includes a shell for customized content. The shell for customized content can include instructions that, when executed, request 344 customized content for the shell from the device service 314. The request 344 can include, for example, information that indicates that the request 344 is associated with the first application 304. The device service 304 can identify and retrieve application data previously stored for the first application 304, customize the shell based on the retrieved application data, and provide a customized content item 346 to the second application 334 responsive to the request 344.

The second application 334 can render 348 the customized content item 346 (e.g., in the content slot included in the second application 334). The user can interact 350 with the customized content item 346. For example, the customized content item 346 can include or be otherwise associated with a link that, when selected, opens 352 (e.g., runs) the first application 304.

The customized content item 346 can be configured to send, upon selection, an interaction indication 354 to the content server 308. The content server 308 can send billing and/or reporting information 356 to the publisher 302, based on the interaction indication 354 (and, for example, based on information related to other impressions or interactions associated with the re-engagement bid 306 occurring on other user devices). For example, the publisher 302 can be billed based on impressions and/or other events (e.g., conversions, interactions). The content server 308 can also credit a publisher of the second application for the impression of and/or interaction with the customized content item 346.

Figure 4:
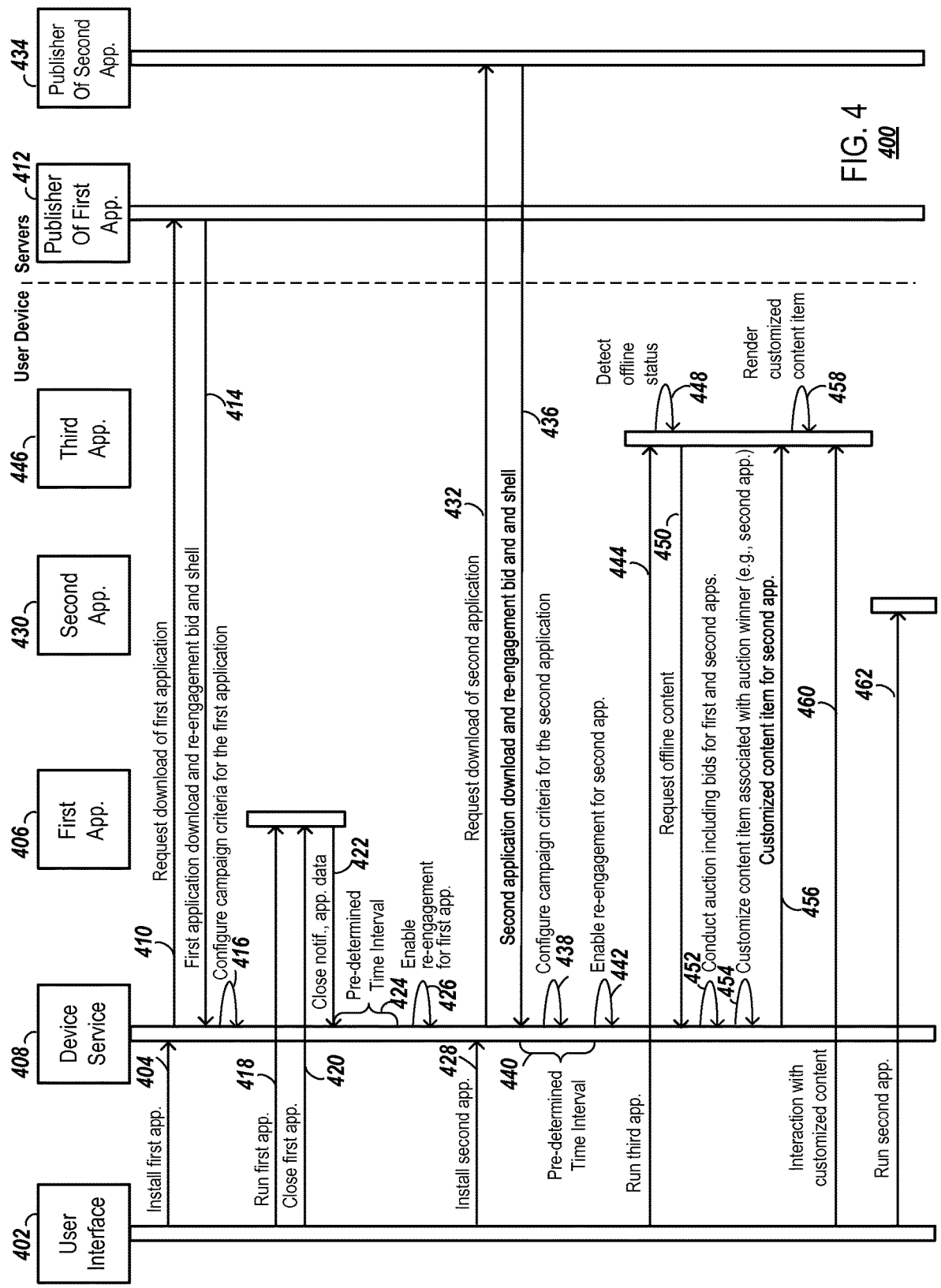
FIG. 4 is a sequence diagram of a process for presenting content in an offline environment.

FIG. 4 is a sequence diagram of a process 400 for presenting content in an offline environment. A user can interact with a user interface 402 of a user device to request 404 installation of a first application 406. The request 404 can be received, for example, by a device service 408 running on the user device. The device service 408 can send a request 410 for download of the first application 406 to a publisher 412 associated with the first application 406. The device service 408 can receive the first application download 414 and can install an instance of the first application 406 on the user device.

The first application download 414 can include or be otherwise associated with a re-engagement bid and a shell (e.g., template) for customized content for the first application. The re-engagement bid can be associated with a re-engagement campaign of the publisher 412 for presenting content on user devices on which the first application 406 has been installed. For example, the re-engagement campaign can be associated with criteria that specifies when content for the campaign is eligible to be presented on the user device. For example, criteria can specify that campaign content associated with the first application 406 is eligible to be presented on the user device when the first application 406 has not been used for at least a threshold amount of time (e.g., after installation or after a last use of the first application 406 on the user device).

The device service 408 can receive one or more of the re-engagement bid, the shell for customized content and campaign criteria associated with the publisher 412 and can configure 416 the campaign criteria so that the campaign is enabled when the campaign criteria is met. The re-engagement bid, the shell for customized content, and the campaign criteria can be received by the device service 408 in other ways. For example the publisher 112 can provide the bid, the shell for customized content, or the campaign criteria to a content server (not shown), and the content server can provide the bid, the shell for customized content, or the campaign criteria to the device service 408.

After the campaign criteria for the publisher 412 is configured, the user can interact with the user interface 402 to open (e.g., run) 418 the first application 406. The user later closes 420 the first application 406. The first application 406 can be configured to provide 422, upon closure, a closure notification, application state information, and other information to the device service 408. The device service 408 can determine that campaign criteria for the publisher for re-engagement have been satisfied, such as a pre-determined time interval 424 associated with the campaign criteria for the publisher 412 has elapsed since the last use of the first application 406. Accordingly, the device service 408 can determine that campaign criteria for the publisher 412 has been met and enable 426 the re-engagement campaign for the first application 406.

In addition to installing and interacting with the first application 406, the user can interact with the user interface 402 to request 428 installation of a second application 430. In response to the request 428, the device service 408 can send a request 432 for download of the second application 340 to a publisher 434 associated with the second application 430. The device service 408 can receive the second application download 436 and can install an instance of the second application 430 on the user device.

Similar to the first application download 414, the second application download 436 can include or be otherwise associated with a re-engagement bid, a shell for customized content, and campaign criteria. The device service 408 can receive, from the publisher 434, one or more of the re-engagement bid, the shell for customized content and campaign criteria associated with the publisher 434 and can configure 438 the campaign criteria so that the campaign is enabled when the campaign criteria is met.

The device service 408 can determine that campaign criteria associated with the publisher 412 have been satisfied, such as a pre-determined time interval 440 associated with the campaign criteria for the publisher 412 has elapsed since the installation of the second application 430 without the user using the second application 430. Accordingly, the device service 408 can determine that campaign criteria for the publisher 434 has been met and enable 442 the re-engagement campaign for the second application 430.

At a later time, when both re-engagement campaigns for the first application 406 and the second application 430 have been enabled, the user interacts with the user interface 402 to open (e.g., run) 444 a third application 446. The third application 446 can be configured to present sponsored content (e.g., in a content slot). In some implementations, the third application 446 can be configured to request content for the content slot from a content server (not shown) when the user device is online and from the device service 408 when the user device is offline. For example, in response to detecting 448 that the user device is offline, the third application 446 can send a request 450 to the device service 408 for content to present in the content slot.

As another example, the third application 446 can be configured to send the request 450 to the device service 408 and the device service 408 can determine whether the user device is online. When the user device is online, the device service 450 can forward the request 450 to a content server. When the user device is offline, the device service 408 can conduct 452 an auction, in response to the request 450, including consideration of the bid associated with the first application 406 and the bid associated with the second application 430. The device service 408 can determine an auction winner (e.g., the second application 430). In some implementations, the device service 408 determines the auction winner by identifying an application with a highest bid. In other implementations, the device service 408 identifies bid qualifying information (e.g., expected performance, or other quality measures) associated with one or more bids, and determines the auction winner based on qualified (e.g., adjusted) bids.

The device service 408 can customize 454 the shell for customized content received for, in this example, the second application 430, to create a customized re-engagement content item associated with the second application 430. For example, the device service 408 can include, in the customized re-engagement content item, the user's name or other information about the user, time information indicating how long ago the user installed the second application, or other information. In some implementations, the device service 408 can create a customized content item from scratch (e.g., not using a shell), in response to the request 450.

The device service 408 can provide the customized re-engagement content item 456 for, in this example, the second application 430, to the third application 446. The third application 446 can render 458 the customized re-engagement content item 456 for the second application in the content slot included in the third application 446. The user can interact 460 with the customized re-engagement content item 456. For example, the customized re-engagement content item 456 can include or be otherwise associated with a link that, when selected, opens 462 (e.g., runs) the second application. Reporting of the impression and/or interaction can be made when the user device returns to an on line status.

In some implementations, a revenue reconciliation process is conducted between the device service 408 and a content server when the user device comes back online. For example, the device service 211 can, while the user device is offline, track charges and credits associated with various application publishers. For example, an advertising cost can be charged to the publisher 434 and a revenue credit can be provided to or otherwise associated with a publisher of the third application 446. In some implementations, both charge(s) and credit(s) can be associated with a same publisher. For example, a content item associated with the third application 446 may have been presented in a content slot of another application while the user device was offline. The revenue reconciliation process can include determining a net charge or credit for an application (or entity associated therewith) for an offline session based on the charges or credits associated the application that occurred during the offline session. In some implementations, a charge/credit system can be used for applications when the device is online as well as offline.

Figure 5:
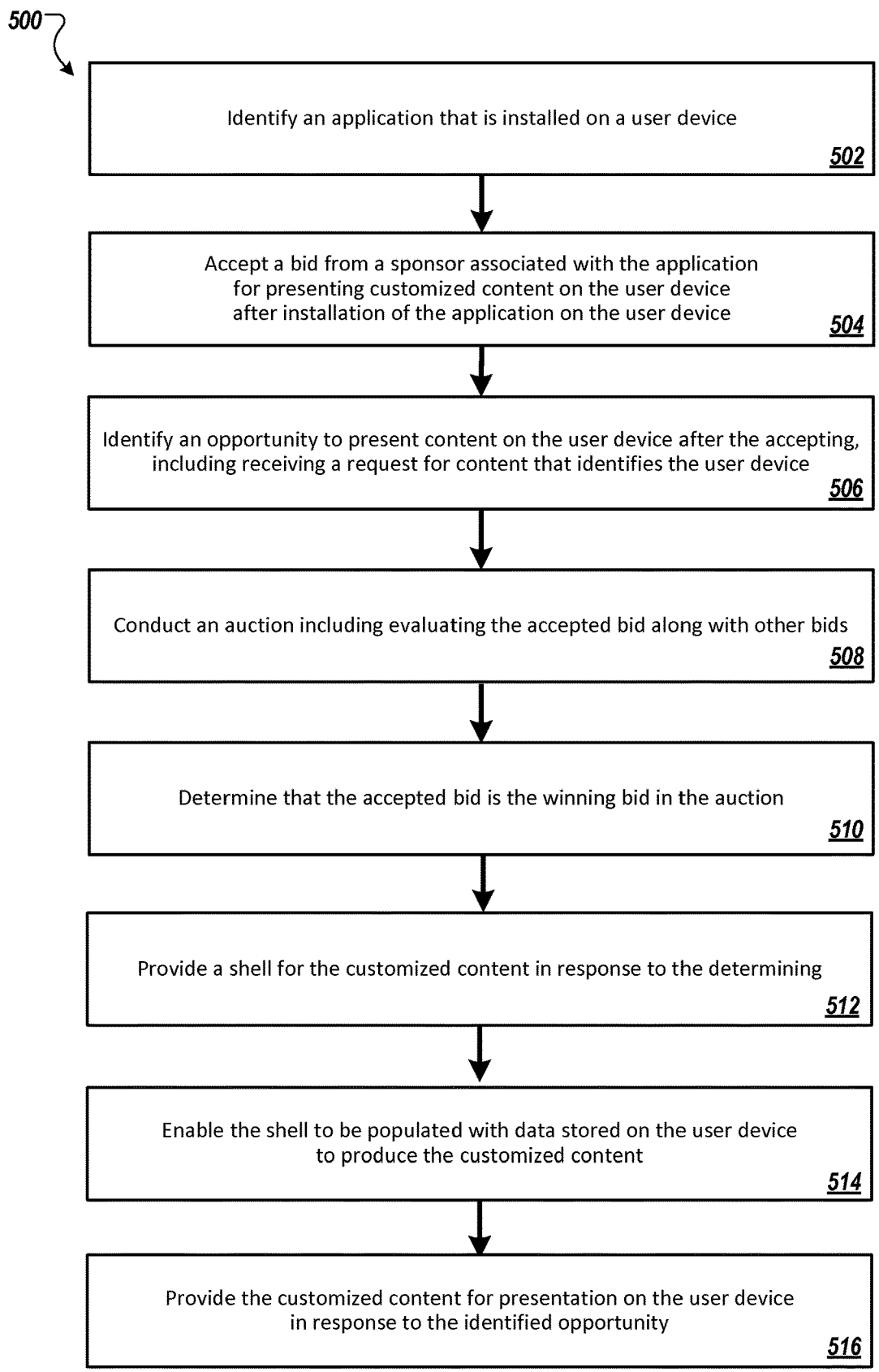
FIG. 5 is a flowchart of an example process for presenting content.

FIG. 5 is a flowchart of an example process 500 for presenting content. The process 500 can be performed, for example, by the content management system 110 described above with respect to FIG. 1 or the content server 218 described above with respect to FIG. 2.

An application that is installed on a user device is identified (502). The user device can be, for example, a mobile device. The application may have been installed on the user device, for example, by a user of the user device, at some time in the past.

A bid is accepted from a sponsor associated with the application for presenting customized content on the user device after installation of the application on the user device (504). The bid can be, for example, a re-engagement bid for presenting customized content on the user device when one or more bid criteria have been satisfied. The bid can reflect a relative measure of value to the publisher of re-engaging with the user. In some implementations, the application is configured to provide the bid to a device service running on the user device, and the device service accepts the bid from the application.

The bid criteria can include, for example, a time since the application was last initiated on the user device. For example, the bid can be for presenting content on the user device when the user has not used the application in the last thirty days. As another example, the bid criteria can include a status level of the user in the application. For example, the bid can be for presenting content on the user device when the status of the user in the application is at a particular level, at least the particular level, not at the particular level, etc. Other examples include the bid being for presenting content when the user had previously used the application at least at a particular frequency but no longer uses the application, when the user installed but never subsequently used the application, when the user has uninstalled the application (e.g., the presented content can be a re-install suggestion), or when the application has recently been auto-updated to a new version.

Bid criteria can be combined. For example, the bid can be for presenting content to the user when a status of the user is at least a particular level and the user has not used the application within a predetermined time period. As another example, bid criteria can include an expiration condition which specifies a condition in which presentation of re-engagement content on the user device is stopped after being previously presented. For example, the bid criteria can specify that campaign content is no longer eligible for presentation on the user device when no interactions with campaign content have occurred with any of a predefined number (e.g., ten) of impressions of campaign content presented on the user device. As another example, the bid criteria can specify that campaign content is no longer eligible for presentation on the user device when campaign content has been presented for a pre-defined number of days (e.g., thirty) with no user interaction with campaign content during that time period.

An opportunity to present content on the user device is identified after the accepting, including receiving a request for content that identifies the user device (506). For example, the opportunity can be an opportunity to present content in another application (e.g., a requesting application) that is installed on the user device. The request for content can include a device identifier of the user device, for example. In some implementations, the bid is determined or adjusted in response to identifying the opportunity. For example, a server can determine an amount to bid in the auction based on the received identity of the user device.

An auction is conducted including evaluating the accepted bid along with other bids (508). Other bids can include, for example, one or more other bids accepted from the sponsor (e.g., for other applications associated with the sponsor), one or more other bids accepted from sponsors of other applications that are installed on the user device, or other bids accepted from other types of content sponsors (e.g., content sponsors not associated with an application installed on the user device).

In some implementations, the opportunity is an offline opportunity and the auction is conducted on the user device. For example, the requesting application can be configured to request content for the opportunity from the device service. In response to the request, the device service can identify the accepted bid from the application along with other bids accepted from other applications, and evaluate the accepted bids along with other bids.

A determination is made that the accepted bid is the winning bid in the auction (510). For example, the accepted bid can be a winning bid based on an auction score of, for example, a quality score times the accepted bid being higher than other auction scores for other bids included in the auction.

A shell for the customized content is provided in response to the determining (512). The shell can be, for example, a template that includes one or more placeholder items. Placeholder items can represent information about the user (e.g., user name), application status for the user, or other information.

The shell is enabled to be populated with data stored on the user device to produce the customized content (514). For example, a service on the device can, for each placeholder item, identify an item of information stored on the device that corresponds to the placeholder item, and substitute the item of information stored on the device for the placeholder item. In some implementations, an API is used to locate customized data associated with the user device and populate the shell with the customized data.

The customized content is provided for presentation on the user device in response to the identified opportunity (516). For example, the customized content can be presented in a content slot of the requesting application.

Figure 6:
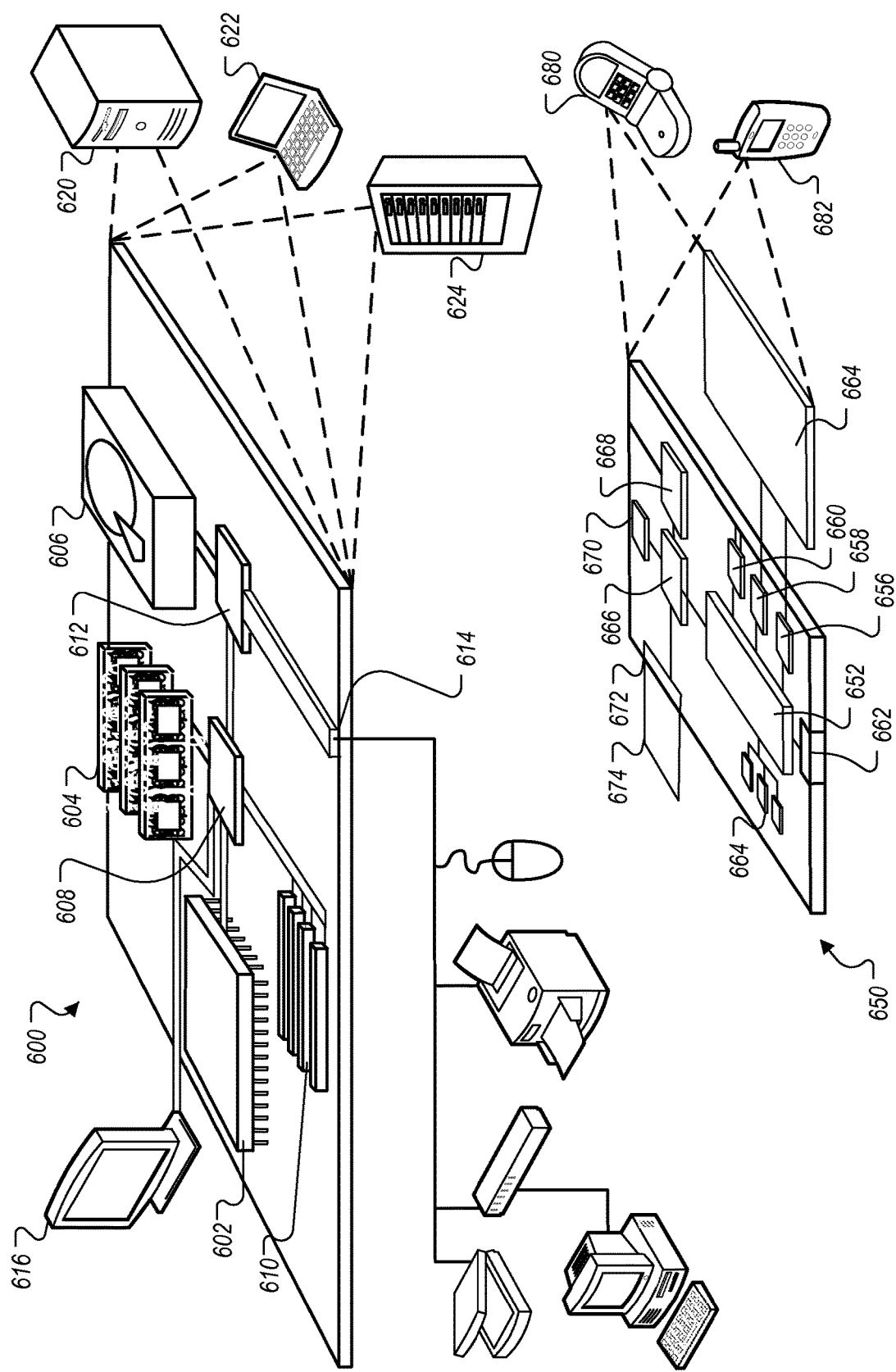
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. The computer-readable medium is not a propagating signal. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is illustrative only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
    identifying a first application that is installed on a user device;
    accepting, by one or more servers, a bid from a sponsor of the first application for presenting customized content on the user device after installation of the first application on the user device and after the first application has not been launched on the user device for a specified amount of time post-installation;
    determining, by the one or more servers, that the first application has not been launched on the user device for the specified amount of time;
    enabling, by the one or more servers, presentation of a content item on the user device using the bid based on the determination that the first application has not been launched on the user device for the specified amount of time;
    after enabling presentation of the content item:
        identifying, after the accepting and the enabling, an opportunity to present content in a second different application that is installed on the user device, including receiving a request for content that identifies the user device and the second application;
        conducting, by the one or more servers, an auction including evaluating the accepted bid along with other bids;
        determining, by the one or more servers, that the accepted bid is the winning bid in the auction and providing, in response to the determining, a shell for the content item;
        populating, at the user device, a placeholder in the shell with data from the first application that (i) is stored on the user device, (ii) corresponds to the placeholder, and (iii) specifies a progress level of the user within the first application to produce a customized content item; and
    presenting the customized content item in the second application that is executing at the user device in response to the identified opportunity that occurs after the determination that the first application has not been launched on the user device for the specified amount of time.

2. The method of claim 1 wherein the bid includes one or more bid criteria selected from the group comprising an identifier for the user device, a time since the first application was last launched on the user device post-installation, a status of a user in the first application, or the user installing but not subsequently using the first application on the user device.

3. The method of claim 1 wherein the auction is conducted on the user device.

4. The method of claim 1 wherein the opportunity is an offline opportunity, the auction is conducted on the user device, and populating the shell includes identifying customization data for the first application that is stored on the user device to be included in the shell to form the customized content item.

5. The method of claim 4 wherein the customization data includes a name of the user, an identifier of a user of the user device, or a status of the user in the first application.

6. The method of claim 1 wherein the shell is a template, and wherein populating the shell further includes using an API to locate customized data for the user device and populating the shell with the customized data.

7. A system comprising:
    one or more processors; and
    one or more memory elements including instructions that when executed cause the one or more processors to:
        identify a first application that is installed on a user device;
        accept a bid from a sponsor of the first application for presenting customized content on the user device after installation of the first application on the user device and after the first application has not been launched on the user device for a specified amount of time post-installation;
        determine that the first application has not been launched on the user device for the specified amount of time;
        enable presentation of a content item on the user device using the bid based on the determination that the first application has not been launched on the user device for the specified amount of time;
        after enabling presentation of the content item:
            identify, after the accepting and the enabling, an opportunity to present content in a second different application that is installed on the user device, including receiving a request for content that identifies the user device and the second application;
            conduct an auction including evaluating the accepted bid along with other bids;
            determine that the accepted bid is the winning bid in the auction and providing, in response to the determining, a shell for the content item;
            populated, at the user device, a placeholder in the shell with data from the first application that (i) is stored on the user device, (ii) corresponds to the placeholder, and (iii) specifies a progress level of the user within the first application to produce a customized content item; and
provide a presentation of the customized content item in the second application that is executing at the user device in response to the identified opportunity that occurs after the determination that the first application has not been launched on the user device for the specified amount of time.

8. The system of claim 7 wherein the bid includes one or more bid criteria selected from the group comprising an identifier for the user device, a time since the first application was last launched on the user device post-installation, a status of a user in the first application, or the user installing but not subsequently using the first application on the user device.

9. The system of claim 7 wherein the auction is conducted on the user device.

10. The system of claim 7 wherein the opportunity is an offline opportunity, the auction is conducted on the user device, and populating the shell includes identifying customization data for the application that is stored on the user device to be included in the shell to form the customized content item.

11. The system of claim 10 wherein the customization data includes a name of the user, an identifier of a user of the user device, or a status of the user in the first application.

12. A computer program product tangibly embodied in a computer-readable storage device and comprising instructions that, when executed by a processor, cause the processor to:
identify a first application that is installed on a user device;
accept a bid from a sponsor of the first application for presenting customized content on the user device after installation of the first application on the user device and after the first application has not been launched on the user device for a specified amount of time post-installation;
determine that the first application has not been launched on the user device for the specified amount of time;
enable presentation of a content item on the user device using the bid based on the determination that the first application has not been launched on the user device for the specified amount of time;
after enabling presentation of the content item:
identify, after the accepting and the enabling, an opportunity to present content in a second different application that is installed on the user device, including receiving a request for content that identifies the user device and the second application;
conduct an auction including evaluating the accepted bid along with other bids;
determine that the accepted bid is the winning bid in the auction and providing, in response to the determining, a shell for the content item;
populated, at the user device, a placeholder in the shell with data from the first application that (i) is stored on the user device, (ii) corresponds to the placeholder, and (iii) specifies a progress level of the user within the first application to produce a customized content item; and
provide a presentation of the customized content item in the second application that is executing at the user device in response to the identified opportunity that occurs after the determination that the first application has not been launched on the user device for the specified amount of time.

13. The product of claim 12 wherein the bid includes one or more bid criteria selected from the group comprising an identifier for the user device, a time since the first application was last launched on the user device post-installation, a status of a user in the first application, or the user installing but not subsequently using the first application on the user device.

14. The product of claim 12 wherein the auction is conducted on the user device.

15. The product of claim 12 wherein the opportunity is an offline opportunity, the auction is conducted on the user device, and populating the shell includes identifying customization data for the application that is stored on the user device to be included in the shell to form the customized content item.

16. The product of claim 15 wherein the customization data includes a name of the user, an identifier of the user of the user device, or a status of the user in the first application.

17. The method of claim 1, wherein determining that the first application has not been launched on the user device for the specified amount of time comprises:
receiving a request for content from the user device for content to present in the first application;
storing a request receipt time of the request;
determining that an amount of time elapsed since the request receipt time is greater than the specified amount of time and that no other requests for content have been received from the user device for the first application since the request receipt time.

18. A method comprising:
identifying an application that is installed on a user device;
accepting, by one or more servers, a bid from a sponsor of the application for presenting customized content on the user device after installation of the application on the user device and after the application has not been launched on the user device for a specified amount of time post-installation;
determining, by the one or more servers, that the application has not been launched on the user device for the specified amount of time;
enabling, by the one or more servers, presentation of a content item on the user device using the bid based on the determination that the application has not been launched on the user device for the specified amount of time;
after enabling presentation of the content item:
identifying, after the accepting and the enabling, an opportunity to present content in another application that is installed on the user device, including receiving a request for content that identifies the user device and the another application;
conducting, by the one or more servers, an auction including evaluating the accepted bid along with other bids;
determining, by the one or more servers, that the accepted bid is the winning bid in the auction and providing, in response to the determining, a shell for the content item;
populating, at the user device, the shell with data that (i) is stored on the user device and (ii) specifies a progress level of the user within the first application to produce a customized content item; and
presenting the customized content item on the user device in response to the identified opportunity that occurs after the determination that the another application has not been launched on the user device for the specified amount of time, to present content in the another application that is executing at the user device.

19. The method of claim 18, wherein the shell is a template, and wherein populating the shell to be populated further includes using an API to locate customized data associated with the user device and populating the shell with the customized data.

* * * * *

UNITED STATES PATENT AND TRADEMARK OFFICE
CERTIFICATE OF CORRECTION

| | |
|---|---|
| PATENT NO. | : 10,943,266 B2 |
| APPLICATION NO. | : 14/737300 |
| DATED | : March 9, 2021 |
| INVENTOR(S) | : Jiang et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 566 days.

Signed and Sealed this
Twenty-second Day of November, 2022

Katherine Kelly Vidal
*Director of the United States Patent and Trademark Office*